United States Patent
Bales et al.

[11] Patent Number: 5,991,263
[45] Date of Patent: Nov. 23, 1999

[54] CHANNEL AND DATA LINK AUTOMATIC RESTORATION

[75] Inventors: Bruce M. Bales, Louisville; Sandra S. North, Berthoud; Stephen M. Thieler, Boulder, all of Colo.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/722,716

[22] Filed: Sep. 30, 1996

[51] Int. Cl.[6] .............................. H04J 3/12; H04M 11/00
[52] U.S. Cl. ......................... 370/225; 370/524; 379/221
[58] Field of Search ..................................... 370/216, 217, 370/218, 225, 228, 264, 389, 400, 409, 410, 420, 438, 465, 469, 522, 524; 340/825.01, 825.03, 826, 827; 379/93.01, 93.14, 201, 219, 220, 221, 271, 272, 273

[56] References Cited

U.S. PATENT DOCUMENTS

| | | | |
|---|---|---|---|
| 4,993,014 | 2/1991 | Gordon | 370/225 |
| 5,014,266 | 5/1991 | Bales et al. | 370/522 |
| 5,142,525 | 8/1992 | Nakatsuma | 370/524 |
| 5,159,594 | 10/1992 | Bales et al. | 370/409 |
| 5,182,750 | 1/1993 | Bales et al. | 370/221 |
| 5,182,751 | 1/1993 | Bales et al. | 370/524 |
| 5,386,466 | 1/1995 | Bales et al. | 379/220 |
| 5,390,242 | 2/1995 | Bales et al. | 379/221 |
| 5,463,629 | 10/1995 | Ko | 370/524 |

*Primary Examiner*—Alpus H. Hsu
*Attorney, Agent, or Firm*—John C. Moran

[57] ABSTRACT

A communication switching system having a plurality of switch nodes with each of the switch nodes responsive to a failure of a communication link within a group of communication links to switch active calls from channels of the failed communication link to idle channels of other communication links within the group of communication links. If no idle channels are available within the group of communication links when the communication link fails, a predefined time is waited for a channel to become idle or a new communication link to be added to the group of communication links before the active channels are abandoned. Advantageously, the switching of the active calls to idle channels occurs quickly so that only a momentary interruption of the calls occurs. The group of communication links may advantageously be a non-facility access service (NFAS) group having a combination of ISDN BRI and PRI communication links. The calls can be either voice, video, or data calls.

24 Claims, 5 Drawing Sheets

CHANNEL AND DATA LINK AUTOMATIC RESTORATION

TECHNICAL FIELD

This invention relates to telecommunication switching systems having a plurality of switching nodes, and, in particular, to the automatic restoration of active channels of a failed telecommunication link to idle channels of another telecommunication link.

BACKGROUND OF THE INVENTION

In prior art telecommunications switching systems comprising a plurality of stored program controlled switch nodes, it is well known that when two switch nodes are interconnected by a plurality of communication links, to form these communication links into a common group that share a signaling channel. For example, ISDN PRI links are formed into a non-facility access service (NFAS) group. Within a NFAS group of PRI links, the D channels (which are normally used for signaling) in all but two of the PRI links are utilized as an additional B (bearer) channel. In the two remaining PRI links, one D channel is designated as the primary D channel, and the D channel of the second remaining PRI link is designated as the secondary D channel. In accordance with CCITT specifications, if the primary D channel is lost, then, the two switching nodes will utilize the secondary D channel for signaling. In accordance with the CCITT specification, if a PRI link is lost no attempt is made to preserve the calls on B channels of the failed PRI link by moving them to B channels of other PRI links within the NFAS group. This results in calls being lost even though there is spare capacity within the NFAS group to continue these calls.

There are a number of reasons why the primary PRI link may be disabled. One reason is that the primary PRI link is a wired link that has been cut accidentally. A second reason is that in a highly distributed system such as illustrated in U.S. Pat. No. 5,390,242 it is necessary to add and remove PRI links interconnecting switch nodes. At present, if calls are not to be terminated, it is necessary to wait until there are no calls being communicated on any of the links making up the NFAS group. This is often done by indicating that each of the links is out of service. In general, this requires field personnel to work during the early morning hours when there is little activity on the system.

In addition to wired PRI links, other links could be utilized such as wireless links. In the case of the wireless links, interruptions of the wireless path can occur which can cause the loss of one or more links of the NFAS group.

It is clear that a problem exists in the art with the present procedure of simply dropping calls on B channels of a failed link. As noted in the previous paragraph, there are a variety of conditions under which such failures can happen on a routine basis, and it is not desirable to lose routine calls.

SUMMARY OF THE INVENTION

The foregoing problems are solved, and a technical advance is achieved by an apparatus and method in a communication switching system having a plurality of switch nodes with each of the switch nodes responsive to a failure of a communication link within a group of communication links to switch active calls from channels of the failed communication link to idle channels of other communication links within the group of communication links. If no idle channels are available within the group of communication links when the communication link fails, a predefined time is waited for a channel to become idle or a new communication link to be added to the group of communication links before the active channels are abandoned. Advantageously, the switching of the active calls to idle channels occurs quickly so that only a momentary interruption of the calls occurs. The group of communication links may advantageously be a non-facility access service (NFAS) group having a combination of ISDN BRI and PRI communication links. The calls can be either voice, video, or data calls.

Other and further aspects of the present invention will become apparent during the course of the following description and by reference to the accompanying drawing.

DETAILED DESCRIPTION

Figure 1:
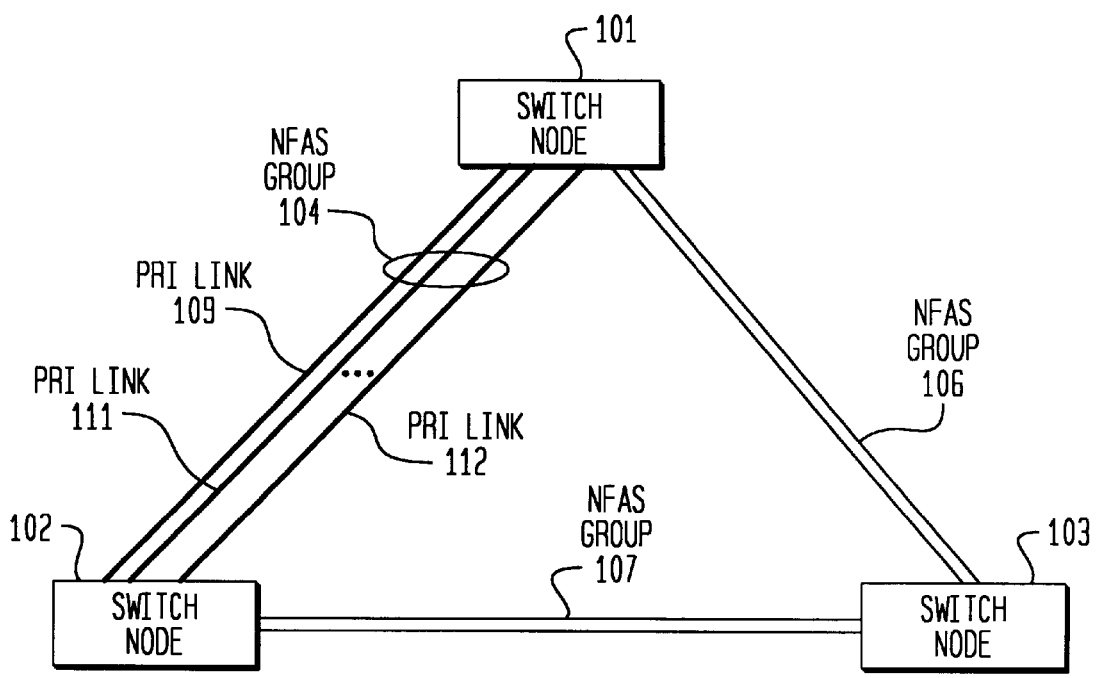
FIG. 1 illustrates, in block diagram form, a telecommunication switching system embodying the inventive concept.

FIG. 1 shows a telecommunication switching system having a plurality of switch nodes 101, 102, and 103. Advantageously, the switch nodes of FIG. 1 function as an integrated system to provide telecommunication services such as those provided by an individual or a network of AT&T Definity® Generic 2 Communications Systems. The switch nodes are shown as being interconnected by groups of communication links which advantageously may be NFAS groups of PRI links. The NFAS groups can also be combinations of BRI and PRI links. Each NFAS group comprises a plurality of PRI links such as PRI links 109 through 112 of NFAS group 104. The switch nodes of FIG. 1 are arranged in a node hierarchy with switch node 101 being the highest switch node of the node hierarchy. The manner in which the node hierarchy initialization, and dialing plan initiationization are performed is described in detail in U.S. Pat. No. 5,386,466 which is hereby incorporated by reference.

Each PRI link in NFAS group 104 comprises 24 channels. If a PRI link is utilized by itself, then the 24 channels of the PRI link are designated as follows: channel 24 is designated as the signaling channel/D channel and is utilized to handle the ISDN messages which are exchanged by the switch nodes. In addition, data calls can be set up on other logical links of the D channel. The remaining 23 channels are designated as B channels and can be utilized for voice or data information. Within a NFAS group, one of the PRI links is designated to carry the primary D channel, such as PRI link 109, and a second PRI link is designated to carry the secondary D channel, such as PRI link 112. In both the primary and secondary PRI link, one of the 24 channels is designated as the D channel and the remaining 23 channels can be utilized for communicating voice or data information. The remaining PRI links, such as PRI link 111 of NFAS group 104, utilize all 24 channels for the communication of voice and data information.

In accordance with the prior art which is the ISDN specification, if PRI link 111 fails, switch nodes 101 and 102 abandon the active calls that were being communicated on B channels of PRI link 111. In accordance with the invention, switch nodes 101 and 102 will transfer the active calls from the B channels of failed PRI link 111 to idle B channels on PRI links 109 and 112. This transfer takes place at a low software layer within both switch nodes 101 and 103 and is done in a minimal amount of time. The result is that the active calls are only interrupted for a small amount of time while the transfer is taking place to the idle B channels of PRI links 109 and 112.

Figure 2:
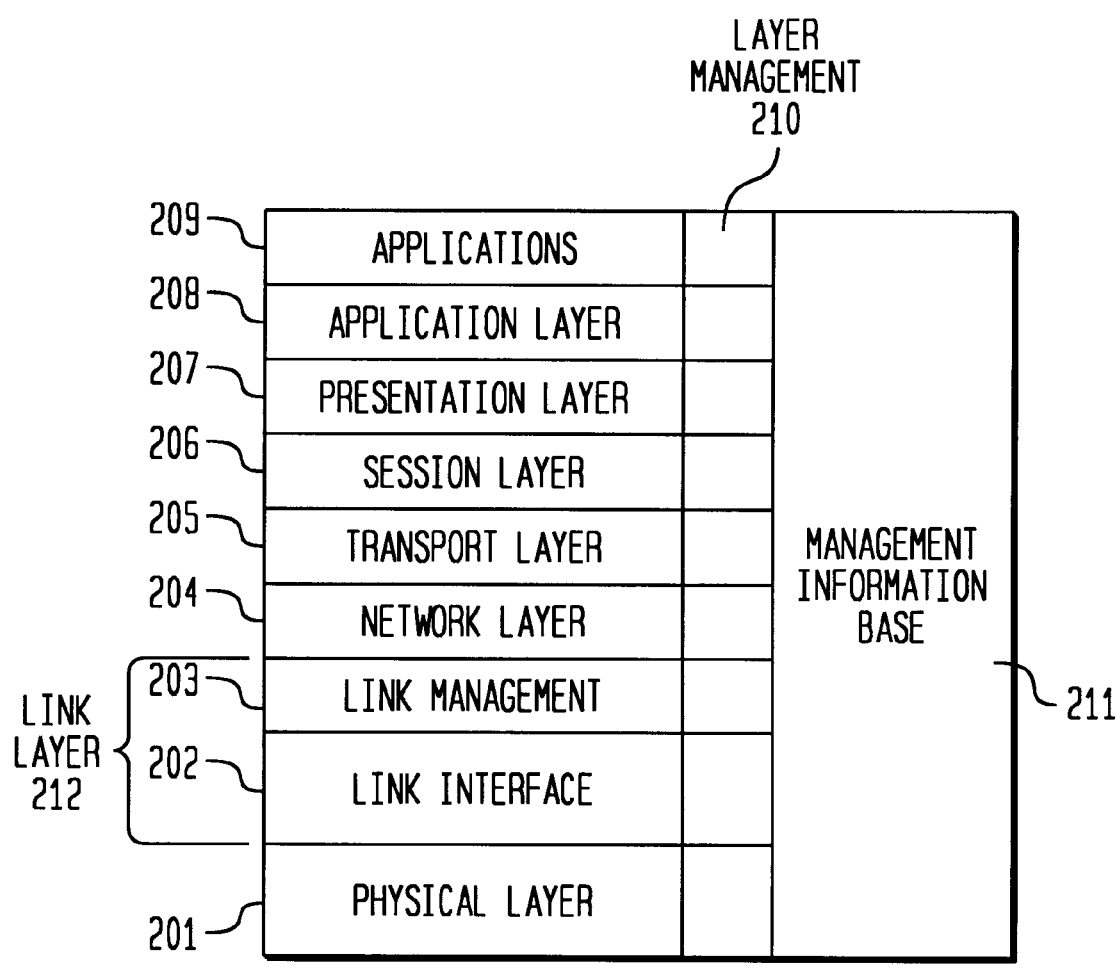
FIG. 2 illustrates a software architecture in accordance with the invention.

FIG. 2 illustrates the software architecture of the switch nodes of FIG. 1. This architecture is based on the conventional OSI model modified to implement the ISDN protocol. Further modifications have been made to this model to incorporate the invention. Software layers 205 through 209 are described in U.S. Pat. No. 5,386,466.

The principal function of physical layer 201 is to terminate physical links. Specifically, physical layer 201 is responsive for maintaining physical channels and for controlling physical sub-channels thereon. Physical layer 201 comprises a software portion and physical interfaces. Further, the software portion of physical layer 201 is responsible for the direct control of the physical interface to which physical links communicate PRI and BRI information terminate. Physical layer 201 presents to link layer 212 physical sub-channels and physical channel as entities controllable by link layer 212. Since physical layer 201 is terminating the physical links, physical layer 201 determines when a D channel of the primary PRI link of a NFAS group has failed because of the lost of framing on the channels of the D channel.

The primary function of link layer 212 is to assure that the information transmitted over a physical channel is recovered intact and in the correct order. This is accomplished using another layer of protocol (referred to as the physical packet protocol) which allows multiple communications paths—commonly referred to as logical links—to be established on a given physical channel or a physical sub-channel communicating packetized data. These logical links are used to identify and process data being communicated between layer 212 and physical layer 201. In ISDN Q.921, the protocol used is the LAPD packet protocol. Further, link layer 212 allows higher software layers to control physical layer 201 in an abstract manner. Link layer 212 uses a first layer of software protocol.

As seen in FIG. 2, link layer 212 is divided into link interface 202 and link management 203. The reason for this division is set forth herein below. It will be helpful at this point to discuss the communication of ISDN signals over a D channel to help readers who have only a rudimentary knowledge of the communication of ISDN signals over a D channel. At link layer 212, a plurality of logical links is established on a D channel. Only one of these logical links communicates ISDN control signals, and this logical link is referred to as a logical D channel (LDC). The LDC is identified by a logical D channel number (LDCN).

Link interface 202 does the majority of the functions performed by link layer 212, including the establishment of logical links. Link management 203 identifies the various link interfaces for higher software layers. Further, link management 203 communicates information between the logical links and higher software layers. In addition, link management 403 is responsive to a signal from physical layer 201 indicating that the primary D channel has lost framing to switch to the D channel of the secondary PRI link of a NFAS group.

Network layer 204 processes information communicated on the LDCs and terminates the ISDN Q.931 protocol. Hence, this layer is responsible for negotiating the utilization of system resources for the termination or origination of calls external to a switching node. The network layer controls the allocation of channels on an interface on which a call is being received or set up. In addition, network layer 204 determines the primary and secondary D channels of a NFAS group. For example, if switch node 102 receives a call setup message from switch node 101 via D channel of PRI link 109, network layer 204 of switch node 102 negotiates with its peer layer (the corresponding network layer 204 in switch node 101) in order to obtain allocation of a B channel for instance on PRI link 111. This negotiation is carried out using standard ISDN Q.931 messages via the LDC setup on the D channel of PRI link 109 (assuming that this is the primary PRI link of NFAS group 104). Greater detail on the manner in which network software layer 204 functions with respect to setting up calls is set forth in U.S. Pat. No. 5,386,466.

Figure 3:
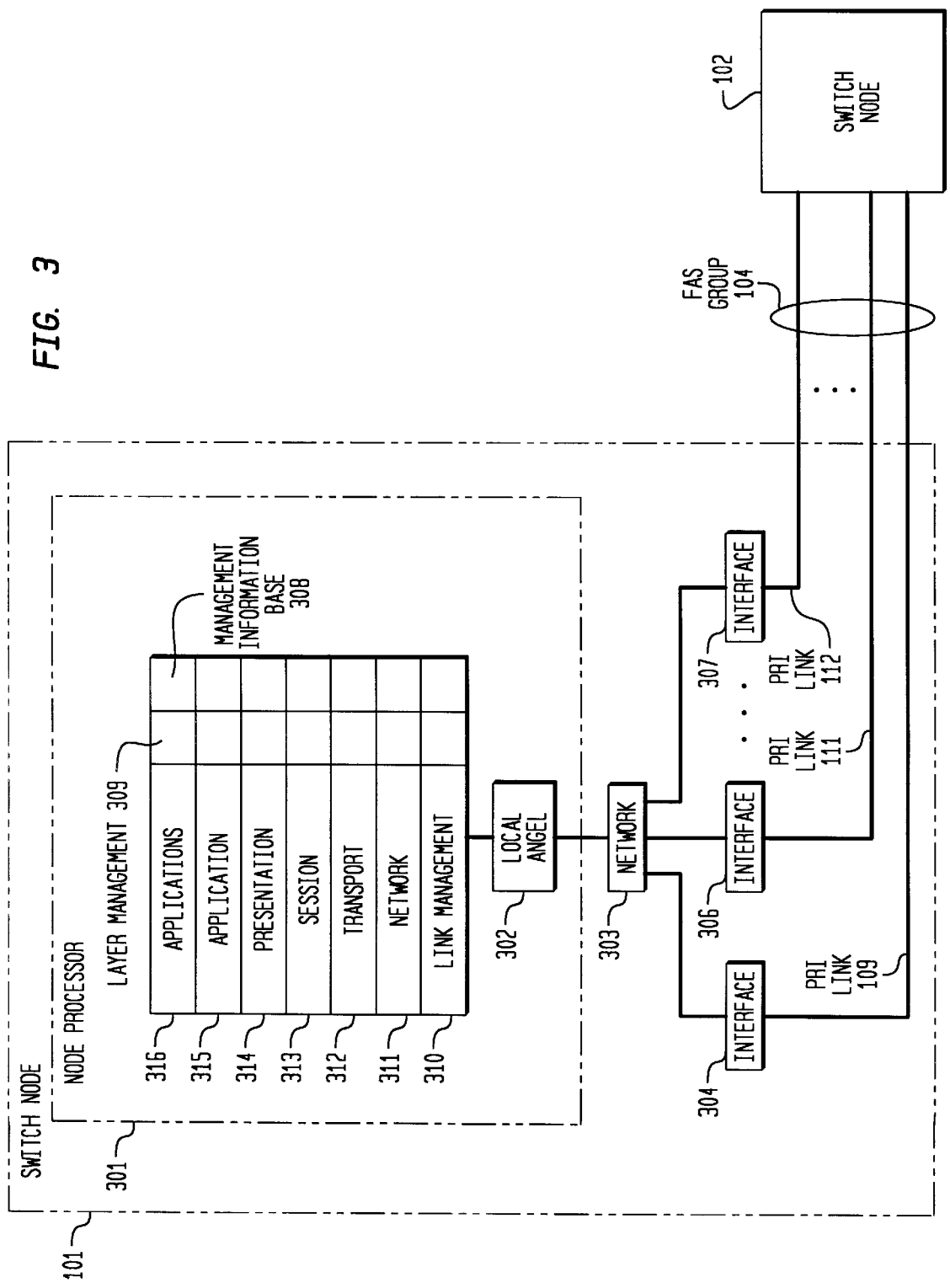
FIG. 3 illustrates, in block diagram form, greater detail of a switch node of the telecommunication switching system of FIG. 1.

FIG. 3 illustrates, in block diagram form, the software architecture of FIG. 2 as implemented in switch node 101. Software layers 203 through 209 are implemented on the main processor of switch node 101 which is node processor 301. Specifically, the software layers down through the link management portion of the link layer are realized by software layers denoted as 316 through 310 in node processor 301. The link interface portion of the link layer is implemented by a software module node in processor 301 designated as local angel 302.

The physical layer is jointly implemented by hardware and software. Specifically, the hardware portion of the physical layer for switch node 102 is implemented by interfaces 304 through 307. The software portion of the physical layer is performed by local angel 302.

Consider now the previous example in greater detail. When PRI link 111 fails, this failure is detected by the physical layers in both switch nodes 101 and 102. The physical layer reports this to the link layers in both switch nodes. The link layers are responsive to the loss of PRI link 111 to send to the interface managers of the network layers a MPH_DEACTIVATE indication that reports a channel is gone. This indication is transmitted for each active channel that is lost. Only the interface manager of the network layer in the switch node that is considered to be the network switch node responds to this indication. The network switch node is assumed to be switch node 101 in the present example. Further information on the significance of the network switch node is set forth in the previously incorporated U.S. patent. Network layer 311 in switch node 101 then commences communication over the primary D channel of NFAS group 104 with network layer 204 in switch node 102 to transfer each of the channels that is reported lost to an idle channel in PRI links 109 and PRI link 112. The network interface manager has access to the tables in each of the PRI links that define the active and the inactive links. Network layer 311 also transmits commands to local angel 302 of FIG. 3 so as to control network 303 to establish internal paths from the new B channel to the second half of the call for each call being transferred.

If there are no idle B channels when PRI link 111 fails, the active calls cannot be transferred to other B channels. After a predefined time-out interval, the network layers in switch node 101 and 102 will drop these calls. However, if a new PRI link becomes active before the time-out interval expires, network layer 311 in switch node 101 is responsive to a L3_DL establish indication from link management layer 310 to commence the transfer of the active calls from failed PRI link 111. The L3_DL establish indication is generated when a new PRI link becomes active. This indication is the attempt restore indication.

Figure 4:
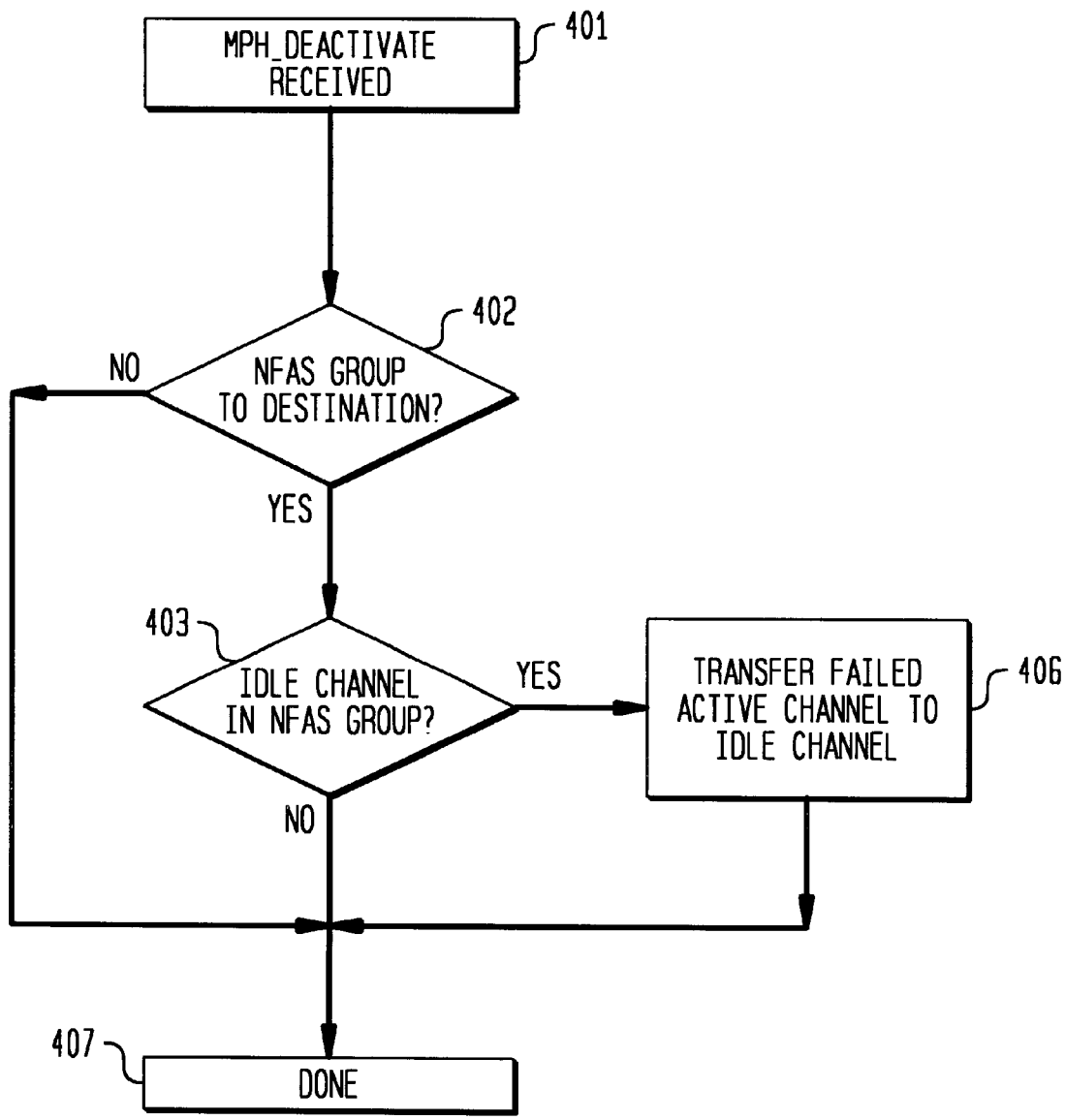
FIG. 4 illustrates, in flow chart form, greater details of the operations performed when an indication is received that an active channel has failed.

FIG. 4 illustrates the steps performed by a network layer when a indication is received from the link management layer that a active channel has been lost. Block 401 shows that the process is initiated by receipt of a MPH_DEACTIVATE. Decision block 402 determines if there is a NFAS group to the destination to which the active channel had been connected. If the answer is no, control is transferred to block 407 which terminates the process. If the answer is yes, decision block 403 determines if there is an idle channel in the NFAS group. If the answer is no, control is transferred to block 407.

Returning to decision block 403, if the answer is yes, that there is an idle channel within the NFAS group, control is transferred to block 406 which transfers the failed active channel to an idle channel of the NFAS group. After execution of block 406, control is transferred to block 407.

Figure 5:
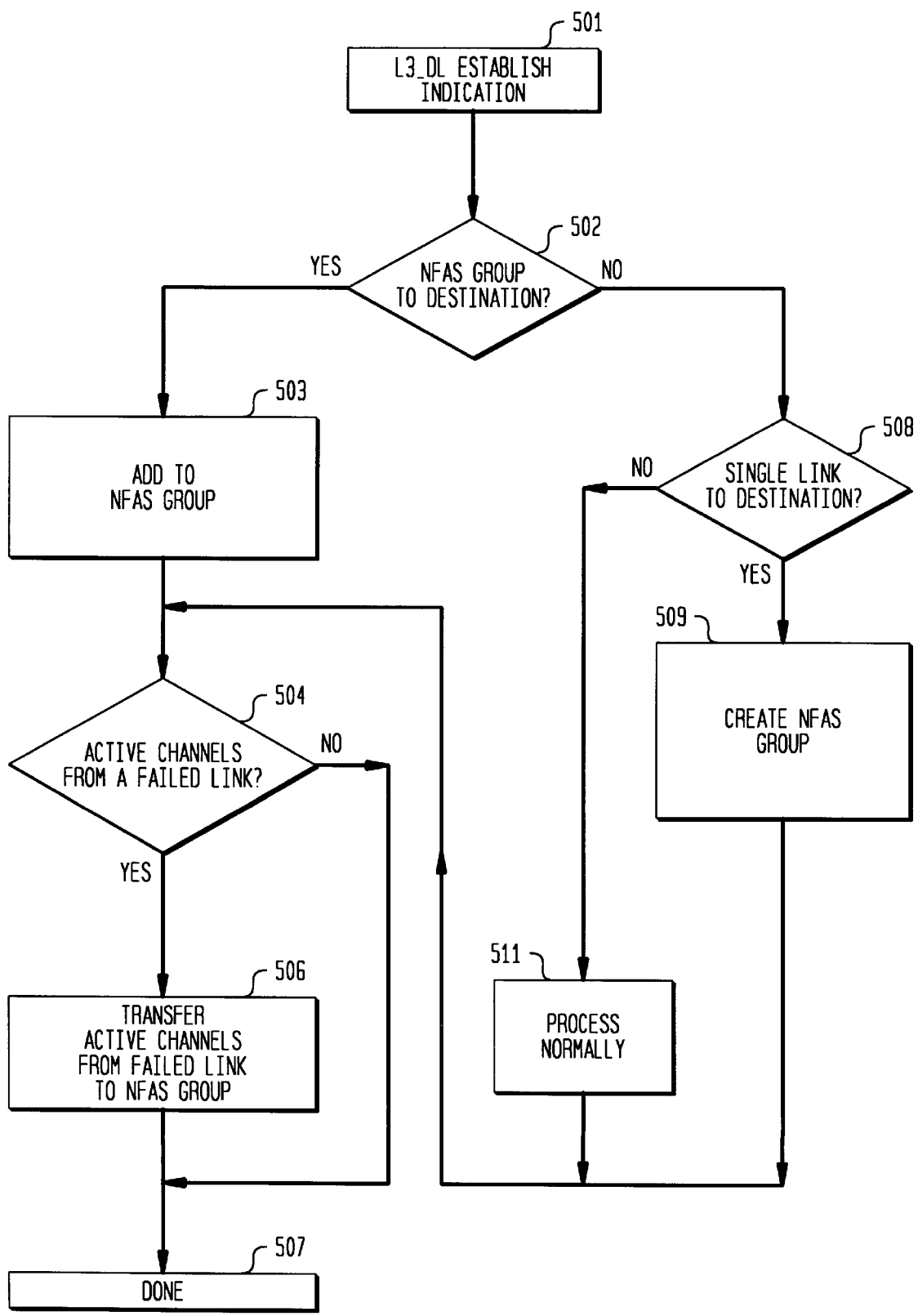
FIG. 5 illustrates, in flow chart form, greater details of the operations performed when an indication is received that a link has been established.

FIG. 5 illustrates the steps performed by a network layer upon being informed that a new link has been established to a destination. The process is started by receipt of a L3_DL establish indication. Upon receipt of this indication, decision block 502 determines if there is already NFAS group to the destination. If the answer is no, control is transferred to decision block 508 which determines if there is a single link to the destination. If the answer in decision block 508 is no, control is transferred to block 511, and the initialization of the link is handled in a normal manner. After execution of block 511, control is transferred to block 504. The operations performed by blocks 504, 506, and 507, are described in the next paragraph. If the answer in decision block 508 is yes, block 509 creates a NFAS group before transferring control to block 511.

Returning to decision block 502, if there already is a NFAS group to the destination, control is transferred to block 503 which adds the new link to the established NFAS group before transferring control to decision block 504. Decision block 504 determines if there are any active channels from a failed link which have not yet timed out. If the answer is no in decision block 504, control is transferred to block 507, and the process is terminated. If the answer is yes in decision block 504, block 506 proceeds to transfer each of the active channels from the failed group to the idle channels of the NFAS group before transferring control to block 507. There are now idle channels in the NFAS group that resulted from the idle channels of the newly established link to the destination.

The invention claimed is:

1. A method of preserving active calls within a group of communication links interconnecting two switch nodes of a telecommunication switching system, comprising the steps of:

detecting a failure of one communication link in the group of communication links that has active channels;

indicating an individual loss of each active channel on the one communication link with each active channel having an individual call;

determining idle channels within the group of communication links;

determining for each call on the lost active channels if each call has individually exceeded a predefined timed-out interval; and only transferring each call of the lost active channels to an idle channel in the group of communication links only upon each call on the lost active channels having been determined not to have exceeded the predefined timed-out interval.

2. The method of claim 1 wherein each of the switch nodes executes a plurality of software layers with the software layers being arranged in a hierarchical structure and the steps of detecting a failure, determining idle channels, and transferring each of the active channels are performed by a lower software layer of the plurality of software layers.

3. The method of claim 2 wherein the active channels are communicating audio information.

4. The method of claim 2 wherein the active channels are communicating data information.

5. The method of claim 1 wherein the group of communication links is a non-facility access service group comprising ISDN PRI links.

6. The method of claim 1 wherein the group of communication links is a non-facility access service group comprising ISDN BRI links.

7. A method of preserving active calls between two switch nodes of a telecommunication switching system interconnected via a communication link, comprising the steps of:

detecting a failure of the communication link that has active channels;

indicating an individual loss of each active channel on the communication link with each active channel having an individual call;

determining initiation of another communication link interconnecting the two switch nodes;

determining for each call on the lost active channels if each call has individually exceeded a predefined timed-out interval; and only transferring each call of the lost active channels to an idle channel of the other communication link only upon each call on the lost active channels having been determined not to have exceeded the predefined timed-out interval.

8. The method of claim 7 wherein each of the switch nodes executes a plurality of software layers with the software layers being arranged in a hierarchical structure and the steps of detecting a failure, determining idle channels, and transferring each of the active channels are performed by a lower software layer of the plurality of software layers.

9. The method of claim 8 wherein the active channels are communicating audio information.

10. The method of claim 8 wherein the active channels are communicating data information.

11. The method of claim 7 wherein the group of communication links is a non-facility access service group comprising ISDN PRI links.

12. The method of claim 7 wherein the group of communication links is a non-facility access service group comprising ISDN BRI links.

13. A method of preserving active calls within a group of communication links interconnecting two switch nodes of a telecommunication switching system, comprising the steps of:

detecting a failure of a only remaining communication link in the group of communication links that has active channels;

indicating an individual loss of each active channel on the only remaining communication link with each active channel having an individual call;

determining initiation of another communication link interconnecting the two switch nodes;

adding the other communication link to the group of communication links;

determining for each call on the lost active channels if each call has individually exceeded a predefined timed-out interval; and only transferring each call of the lost active channels to an idle channel of the other of communication link only upon each call of the lost active channels having been determined not to have exceeded the predefined timed-out interval.

14. The method of claim 13 wherein each of the switch nodes executes a plurality of software layers with the software layers being arranged in a hierarchical structure and the steps of detecting a failure, determining idle channels, and transferring each of the active channels are performed by a lower software layer of the plurality of software layers.

15. The method of claim 14 wherein the active channels are communicating audio information.

16. The method of claim 14 wherein the active channels are communicating data information.

17. The method of claim 13 wherein the group of communication links is a non-facility access service group comprising ISDN PRI links.

18. The method of claim 13 wherein the group of communication links is a non-facility access service group comprising ISDN BRI links.

19. A telecommunication switching system including two switch nodes interconnected by a group of communication links, each switch node comprising:

means for detecting a failure of one communication link in the group of communication links that has active channels;

means for indicating an individual loss of each active channel on the one communication link with each active channel having an individual call;

means for determining idle channels within the group of communication links;

means for determining for each call on the lost active channels if each has individually exceeded a predefined timed-out interval; and means for only transferring each call of the lost active channels to an idle channel of the group of communication links only upon each call on the lost active channels having been determined not to have exceeded the predefined timed-out interval.

20. The telecommunication switching system of claim 19 wherein each of the switch nodes executes a plurality of software layers with the software layers being arranged in a hierarchical structure and means for detecting a failure, determining idle channels, and transferring each of the active channels are performed by a lower software layer of the plurality of software layers.

21. The telecommunication switching system of claim 20 wherein the active channels are communicating audio information.

22. The telecommunication switching system of claim 20 wherein the active channels are communicating data information.

23. The telecommunication switching system of claim 19 wherein the group of communication links is a non-facility access service group comprising ISDN PRI links.

24. The telecommunication switching system of claim 19 wherein the group of communication links is a non-facility access service group comprising ISDN BRI links.

* * * * *